United States Patent
Mombers et al.

(10) Patent No.: US 8,643,783 B2
(45) Date of Patent: Feb. 4, 2014

(54) VERTICAL FIELD DETECTION FOR TELEVISION RECEIVERS

(75) Inventors: Friederich Mombers, Sunnyvale, CA (US); Alain-Serge Porret, Sunnyvale, CA (US); Melly Thierry, Lausanne (CH)

(73) Assignee: SiGear Europe Sarl, Lausanne (CH)

( * ) Notice: Subject to any disclaimer, the term of this patent is extended or adjusted under 35 U.S.C. 154(b) by 0 days.

(21) Appl. No.: 13/447,199

(22) Filed: Apr. 14, 2012

(65) Prior Publication Data

US 2013/0271658 A1 Oct. 17, 2013

(51) Int. Cl.
- *H04N 5/06* (2006.01)
- *H04N 9/45* (2006.01)
- *H04N 9/455* (2006.01)
- *H04N 5/04* (2006.01)
- *H04N 9/47* (2006.01)

(52) U.S. Cl.
USPC ............................ 348/521; 348/500; 348/550

(58) Field of Classification Search
USPC ......................................................... 348/551
See application file for complete search history.

(56) References Cited

U.S. PATENT DOCUMENTS

| | | | |
|---|---|---|---|
| 4,319,275 A | 3/1982 | Tanaka | |
| 5,663,768 A * | 9/1997 | Yang | 348/557 |
| 7,701,512 B1 * | 4/2010 | Woodall et al. | 348/526 |
| 2003/0067555 A1 * | 4/2003 | Han | 348/558 |
| 2005/0179819 A1 * | 8/2005 | Bhaskar et al. | 348/614 |
| 2009/0040393 A1 * | 2/2009 | Gomez | 348/731 |
| 2011/0051013 A1 * | 3/2011 | Hamaguchi et al. | 348/731 |

* cited by examiner

*Primary Examiner* — Jefferey Harold
*Assistant Examiner* — Michael Teitelbaum
(74) *Attorney, Agent, or Firm* — Van Pelt, Yi & James LLP

(57) ABSTRACT

A method in a television receiver receiving interlaced analog modulated television signals includes: detecting an inactive video period in the television signal between two successive video display fields; generating a synchronization signal indicative of the detected inactive video period; and in response to the synchronization signal, performing measurement and adjustment operations on analog circuitry of the television receiver. In another embodiment, a method in a television receiver receiving interlaced analog modulated television signals includes: detecting an inactive video period between two successive video display fields using a not-fully-demodulated intermediate frequency (IF) signal; and generating a synchronization signal indicative of the detected inactive video period. In another embodiment, a vertical field detection circuit in a television receiver includes a vertical field detector circuit configured to detect an inactive video period in the television signal between two successive video display fields using a not-fully-demodulated intermediate frequency (IF) signal.

15 Claims, 13 Drawing Sheets

VERTICAL FIELD DETECTION FOR TELEVISION RECEIVERS

FIELD OF THE INVENTION

The invention relates to television receiver and, in particular, to a television receiver performing vertical field synchronization detection.

DESCRIPTION OF THE RELATED ART

A television (TV) or video recorder includes a television signal receiver (or television receiver) to receive terrestrial broadcast, cable television or satellite broadcast television signals and to process the television signals into the appropriate video and audio signals for display or for recording. Television signals are transmitted in analog or digital modulation formats and in accordance with a variety of standards. For analog television transmission, the NTSC (National Television Standards Committee) standard, the PAL (Phase Alternate Lines) standard, and the SECAM (Sequential Couleur Avec Memoire) standard are widely adopted. On the other hand, for digital television (DTV) transmission, the DVB (Digital Video Broadcast) format, the ATSC (Advanced Television Standards Committee) format and other digital television broadcasting formats are available.

Complex Radio-Frequency (RF) receivers generally benefit from having one part of the processing being executed in the analog domain and the other part being carried out in the digital domain after adequate analog-to-digital conversion. These RF receivers are referred to as mixed-signal receivers and generate digital output signals indicative of the received television signals. FIG. 1 is a schematic diagram illustrating the general architecture of a conventional mixed-signal RF receiver. Referring to FIG. 1, a mixed-signal RF receiver 10 includes an RF/Analog front-end circuit 12 that receives an incoming RF input signal (RF-IN), selects a channel from the incoming analog RF signal and down converts the selected channel signal to a low intermediate frequency (low-IF) signal or a zero intermediate frequency (zero-IF) signal where the intermediate frequency is low or around DC. The RF/Analog front-end circuit 12 also applies signal amplification to achieve maximum signal quality without introducing nonlinearities.

The low-IF (or zero-IF) signal is then digitized by an analog-to-digital converter (ADC) 14 at a given ADC sampling rate. The digitized IF signal is then processed entirely in the digital domain by a digital signal processing (DSP) circuit 16. After digital processing, the processed low-IF signal is provided as an output signal in digital format (signal 20) or in analog format (signal 22) after digital-to-analog conversion by a digital-to-analog converter (DAC) 18.

In the present description, a mixed-signal RF receiver is sometimes referred to as a TV receiver or a TV tuner when the incoming RF input signal is a television signal. When the incoming RF signal is a television signal, the DSP circuit 16 processes the low-IF signal by applying transformations as determined by the television format and standard of the TV signal, and also the nature of the modulated television channel.

For instance, when the received RF signal is a digital modulated television signal such as DVB-T, ISDB-T, ATSC, T-DMB, DVB-C, or DVB-S, the DSP circuit of the TV receiver may performing the following one of the following two types of processing:

(i) Channel selection and filtering with amplification including, if necessary, some analog imperfection correction such as image rejection improvement or channel filter droop/ripple compensation. In this case, the output of the receiver is usually a low-IF analog signal obtained after digital-to-analog conversion of the processed digital TV signal, such as the analog output signal on node 22 of the receiver 10 of FIG. 1.

(ii) Channel selection and complete digital demodulation of the received TV signal into a MPEG-2 Transport Stream that is routed in digital format at the output of the TV tuner.

On the other hand, when the received RF signal is an analog modulated television signal such as PAL, NTSC, or SECAM depending on the country, the DSP circuit of the TV receiver may performing the following one of the following two types of processing:

(iii) Channel selection and filtering with amplification including, if necessary, some analog imperfection correction such as image rejection improvement or channel filter droop/ripple compensation. In this case, the output of the receiver is usually a low-IF analog signal obtained after digital-to-analog conversion of the processed analog TV signal, such as the analog output signal on node 22 of the receiver 10 of FIG. 1.

(iv) Channel selection and analog video signal demodulation as well as sound extraction/separation. This process typically includes having a NTSC/PAL or SECAM video demodulation circuitry as well as some carrier recovery process to lock on the incoming video signal with further sound/video splitting. In this case the output of the tuner is typically analog composite video (CVBS) and inter-carrier audio (SIF) signals.

A TV receiver designed to only process digital modulated television signal is usually referred to as a Digital-Only TV receiver. A TV receiver designed to process only analog modulated television signal is usually referred to as an Analog-Only TV receiver. Finally, a Hybrid TV receiver is designed to handle both analog and digital modulated TV signals.

Moreover, some TV receivers or TV tuners are designed to handle only channel selection and filtering functions (cases i and iii above). Such TV receivers are often referred to as RF-Only TV receivers. Some TV receivers or TV tuners are designed to handle signal demodulation on top of channel selection and filtering functions (cases ii and iv). These TV receivers are often referred to as Two-In-One TV receivers.

FIG. 2 illustrates a conventional RF-Only television receiver architecture for analog or digital modulated TV signals. FIG. 3 illustrates a conventional Analog-Only or Hybrid Two-In-One television receiver architecture. It should be noted that these architectures can possibly include one or two analog-to-digital (ADC) converter(s) and one or two digital-to-analog converter(s) (DAC). Conventional television receiver architectures often opt to process the video and audio signals in the digital domain to benefit from digital implementation advantages and therefore need A/D and D/A converters between the analog and digital domains. The number of converters needed will be determined by the architecture choices, such as Low-IF or Zero-IF, real or complex signal representation. RF receivers for receiving analog modulated TV signals, such as receiver 30 of FIG. 2 and receiver 50 of FIG. 3, typically include a monitoring circuit 44, 60 to perform monitoring functions. The monitoring circuit measures operational parameters of the analog circuitry of the receiver and make appropriate adjustments to enhance the performance of the receiver.

SUMMARY OF THE INVENTION

According to one embodiment of the present invention, a method in a television receiver receiving interlaced analog modulated television signals includes: detecting an inactive video period in the television signal between two successive video display fields; generating a synchronization signal indicative of the detected inactive video period; and in response to the synchronization signal, performing measurement and adjustment operations on analog circuitry of the television receiver.

According to another aspect of the present invention, a method in a television receiver receiving interlaced analog modulated television signals includes: detecting an inactive video period between two successive video display fields using a not-fully-demodulated intermediate frequency (IF) signal; and generating a synchronization signal indicative of the detected inactive video period.

According to yet another aspect of the present invention, a vertical field detection circuit in a television receiver receiving interlaced analog modulated television signals includes a vertical field detector circuit configured to detect an inactive video period in the television signal between two successive video display fields using a not-fully-demodulated intermediate frequency (IF) signal. The vertical field detector circuit generates a vertical field detect signal indicative of the detected inactive video period.

The present invention is better understood upon consideration of the detailed description below and the accompanying drawings.

DETAILED DESCRIPTION OF THE PREFERRED EMBODIMENTS

Figure 1:
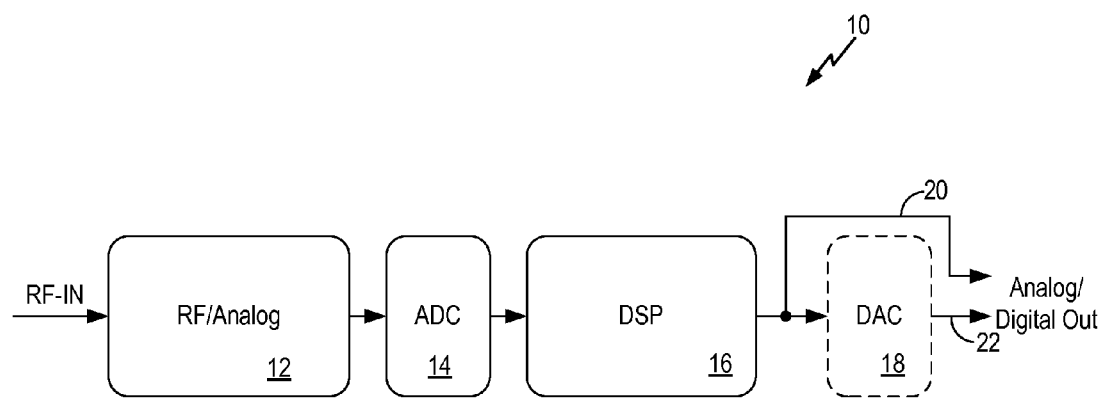
FIG. 1 is a schematic diagram illustrating the general architecture of a conventional mixed-signal RF receiver.

In accordance with the principles of the present invention, a mixed-signal television receiver receiving an analog modulated television signal incorporates a vertical field detect circuit and method to generate a vertical field detect signal based on a low IF or zero-IF signal that has not been fully demodulated. The vertical field detect signal indicates the end of one vertical field and the beginning of the next vertical field in the analog modulated television signal. The mixed-signal television receiver utilizes the vertical field detect signal to synchronize measurement and adjustment operations so that all measurement and adjustment operations are performed during the inactive video period between two successive vertical fields.

The ability to schedule measurement and adjustment operations during the inactive video period provides many advantages. First, the television signal is not modulated, or does not contain luminance information, during the inactive video period and therefore it is possible to perform measurements of various parameters of the signal without interference from the signal modulation. Second, the inactive video period is not displayed on the display screen and thus not visible to the viewer. Accordingly, signal adjustments or compensations can be performed without causing a glitch in the displayed images. For example, it is often difficult to perform DC offset compensation, particularly for zero-IF signals, because the signal contains luminance information at or near DC. However, in accordance with embodiments of the present invention, when the measurement and adjustment operations are synchronized to the analog-modulated television signal using the vertical field detect signal, the DC offset compensation can be performed during the inactive video period when the signal is not modulated. Image rejection measurement and compensation is also preferably performed during the inactive video period when there is no modulated signal.

In embodiments of the present invention, the vertical field detect circuit and method is applicable for analog modulated television signals and the vertical field detect circuit is thus implemented in an Analog-Only or Hybrid television receivers. The TV receivers can be constructed using the RF-only architecture or using the Two-In-One architecture. The vertical field detect circuit is particularly useful in an RF-only TV receiver as the TV receiver generates only a low-IF or zero-IF signal that is not fully demodulated as the processed output signal. While a fully demodulated signal provides timing information of the television signal which can be made available to the television receiver, the low-IF or zero-IF signal does not provide any timing information directly. The vertical field detect circuit of the present invention operates on the not-fully-demodulated low/zero-IF signal to extract timing information sufficient to detect the inactive video period between two vertical fields.

In the present description, the inactive video period between two vertical display fields is referred to as the vertical refresh period, which is also referred to as the "vertical blanking interval" in some cases. The vertical refresh period refers to the time between the last video line of one field of a raster display and the beginning of the first video line of the next field. The vertical refresh period contains inactive video lines which are not displayed on the screen. Inactive video lines refers to video lines that do not contain luminance information or picture information. The video lines are also said to be unmodulated and basically does not carry any pertinent visual data. In general, the television signal contains a pulse sequence transmitted during the vertical refresh period for performing equalizing and horizontal synchronization. In particular, the pulse sequence typically includes pre-equalizing pulses, serration pulses, post-equalizing pulses as the pulse sequence during the vertical refresh period. The equalizing pulses are provided for equalizing the signal levels while the serration pulses are used to keep the horizontal oscillator synchronized during the vertical refresh period.

Figure 2:
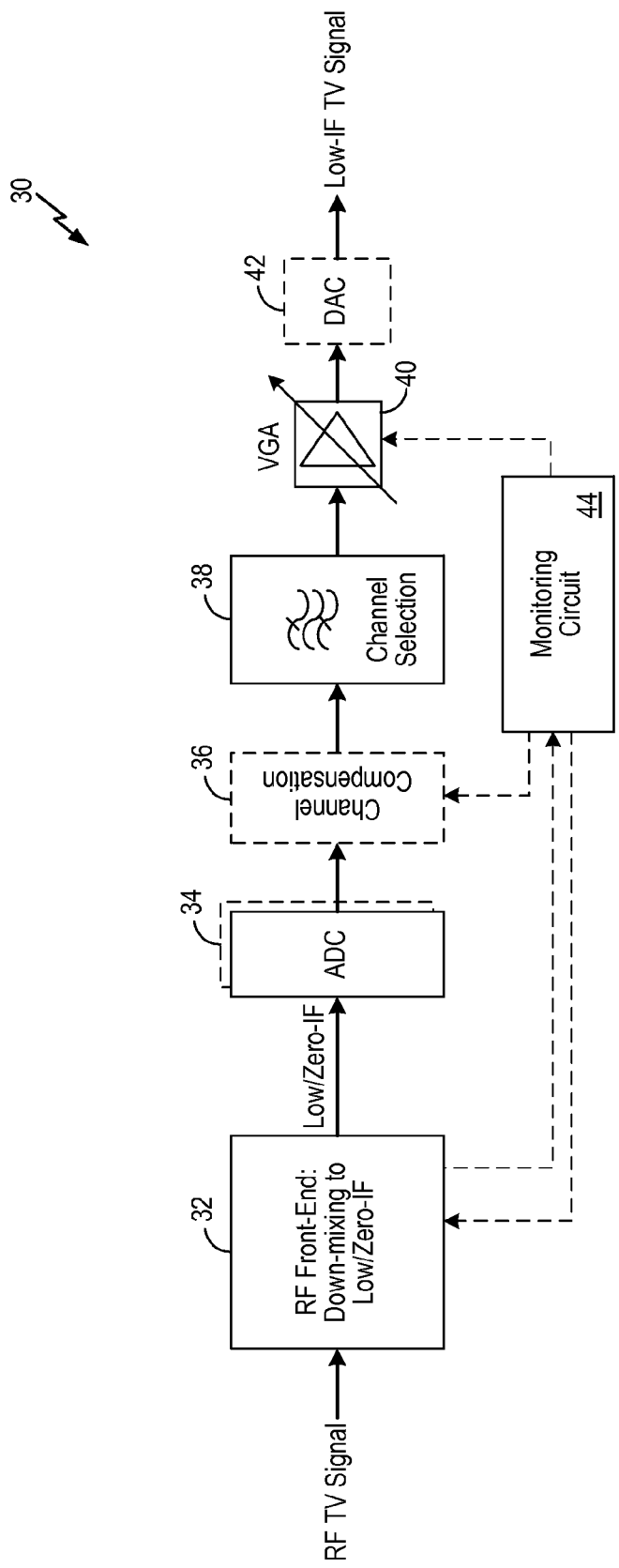
FIG. 2 illustrates a conventional RF-Only television receiver architecture for analog or digital modulated TV signals.
Figure 3:
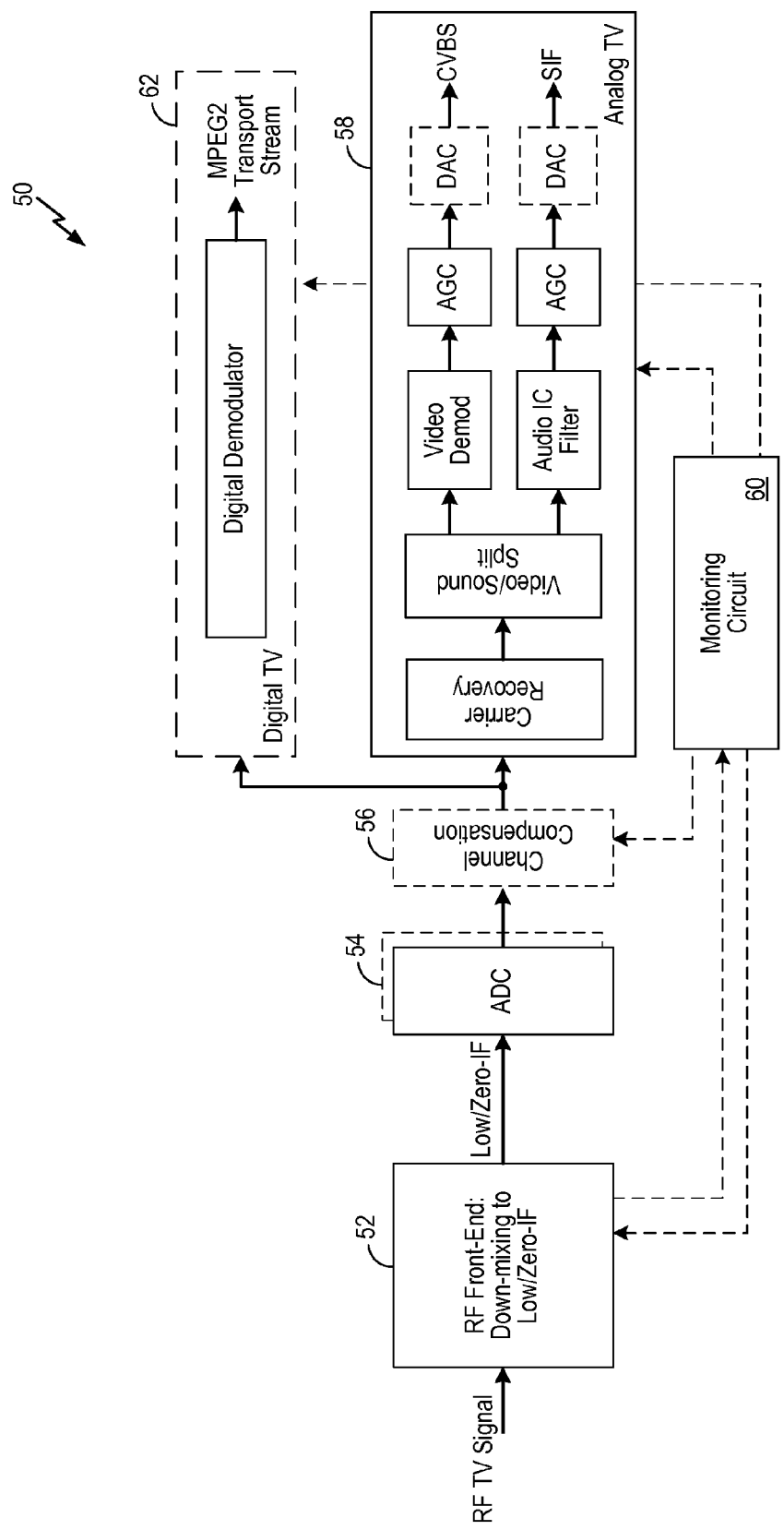
FIG. 3 illustrates a conventional Analog-Only or Hybrid Two-In-One television receiver architecture.
Figure 4:
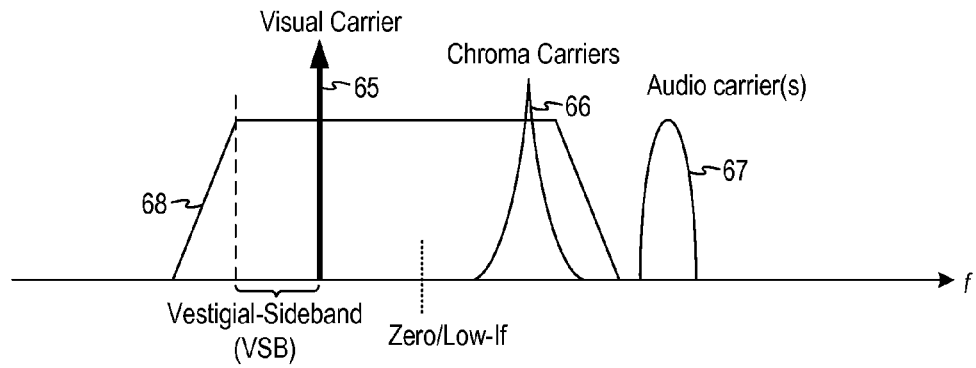
FIG. 4 depicts the frequency spectrum of a low-IF or zero-IF analog TV signal at the output of an RF front-end circuit.

In embodiments of the present invention, the mixed-signal television receiver down converts the incoming analog modulated television signal to a low-IF or zero-IF signal. FIG. 4 depicts the frequency spectrum of a low-IF or zero-IF analog TV signal at the output of the RF front-end circuit, such as the RF front-end circuit 32 or 52 in FIGS. 2 and 3. The zero/low-IF signal spectrum includes a visual carrier 65, chroma carriers 66 and audio carriers 67 centered about the zero/low IF frequency value. The vestigial-sideband (VSB) to the left of the visual carrier 65 and the full upper sideband to the right of the visual carrier 65 contains the luminance information 68 of the television signal. In the case where the incoming analog television signal is down-mixed to zero-IF, that is the center of the spectrum in FIG. 4 is aligned around DC, then two analog-to-digital converters are needed in the receiver to represent the signal in quadrature form, that is, in complex representation.

Designing Hybrid or Analog-Only TV tuner is generally more challenging than a Digital-Only TV tuner because the demanded SNR (signal-to-Noise ratio) is usually higher for analog modulated television signals. Indeed by the very nature of analog circuitries and the high performance demanded, continuous monitoring and adjustments of the analog circuitries parameters must be implemented, especially for analog modulated television signal. These monitoring and adjustments can include DC offset cancellation or mixer quadrature-matching correction and other parameters. In addition, because the transmitted signal power can vary over time due to dynamic channel fading, the gain of various stages inside the analog and digital part of the processing of the receiver must be constantly adjusted to maximize performance. While this continuous monitoring-adjustment process can usually be done at a relatively low rate (few tens of Hz), it is usually very challenging to avoid any visible artifacts on the display as the adjustments will affect the amplitude-modulated luminance signal carried by the visual carrier. Viewer experience can be very much degraded if tuner control parameter adjustments are made during active video when the adjustments may be visible to the viewer. Sound and chrominance are somewhat less affected because they have narrower bandwidth and are frequency or phase modulated, as shown in FIG. 4.

Analog Television Signal

Figure 5:
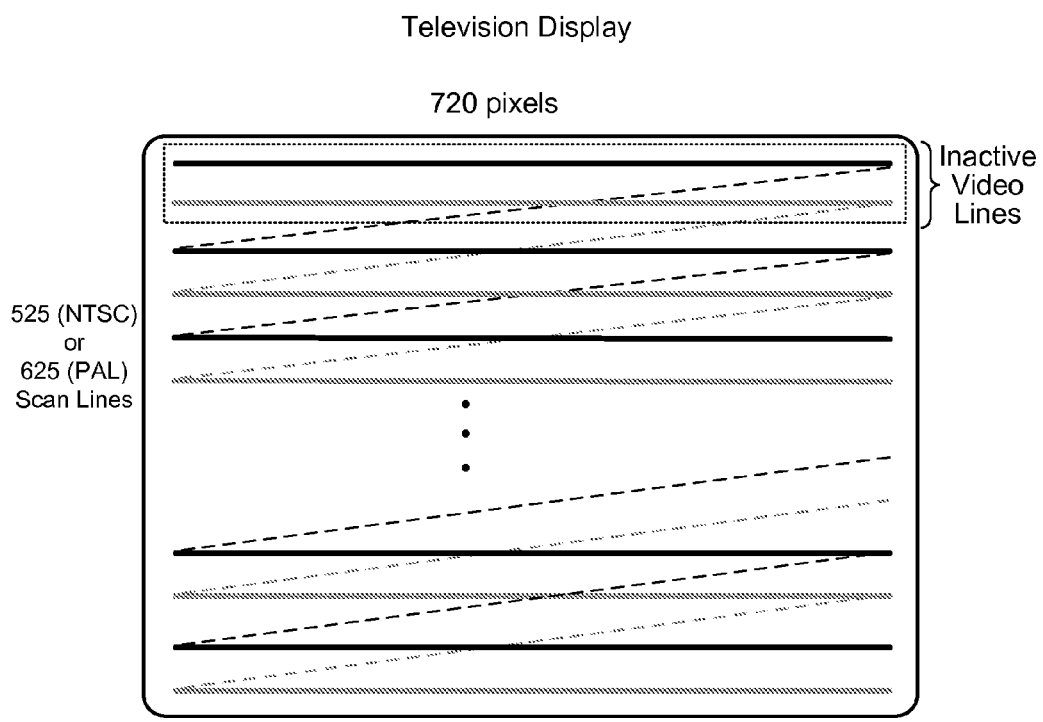
FIG. 5 illustrates a television display with the video signal in the interlaced format.

Analog TV broadcast transmits video signal in interlaced format with two successive fields creating a whole frame picture. FIG. 5 illustrates a television display with the video signal in the interlaced format. Referring to FIG. 5, a full frame picture is formed by video lines of one display field (e.g. black lines) and then followed by video lines of the other display field (e.g. gray lines), the display fields display alternate video lines, forming an interlaced pattern. The field rate (50 Hz/59.94 Hz), the number of line per field (625/525) as well as the horizontal refresh rate (15.625 KHz/15.734 Khz) will depend on the broadcast standard (i.e., NTSC/PAL/SECAM) and the country. The luminance information will amplitude-modulate (AM) the visual carrier with subsequent vestigial-sideband (VSB) filtering to limit the signal bandwidth. Either the inverted luminance signal (negative polarity as in NTSC-M) or non-inverted luminance signal (positive polarity as in SECAM-L) is used to modulate the visual carrier accordingly to the broadcast standard.

Figure 6:
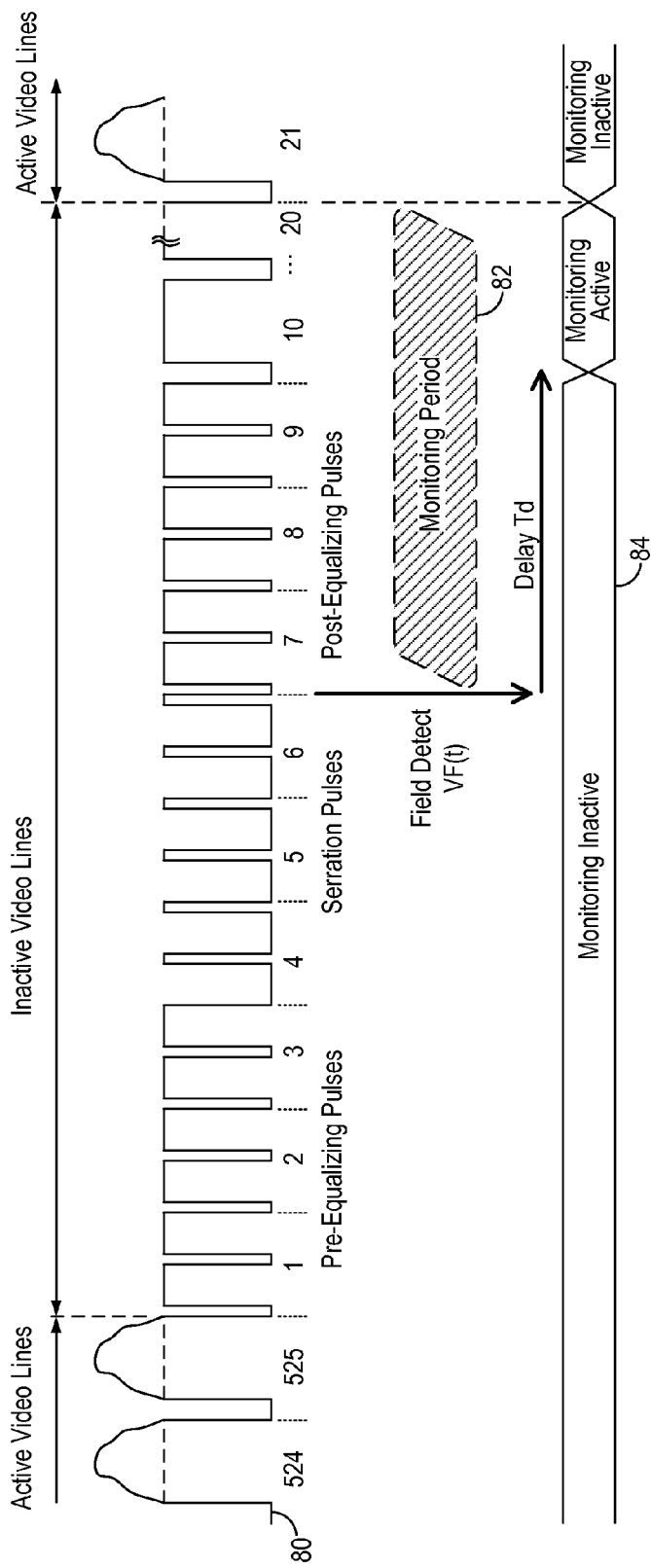
FIG. 6 illustrates the video lines and the pulse sequence transmitted during the vertical refresh period of an analog modulated television signal.

In conventional analog modulated television signals, not all of the broadcasted video lines carry effective visual information. In fact, as described above, there is a vertical refresh period between the end of one display field and the beginning of the next display field. The vertical refresh period contains inactive video lines which are not displayed or visible on the display screen. FIG. 6 illustrates the video lines and the pulse sequence transmitted during the vertical refresh period of an analog modulated television signal. Referring to FIG. 6, curve 80 illustrates the video lines of an analog modulated television signal transmitted under the NTSC transmission standard. Curve 80 is illustrative only and is used herein to represent a fully demodulated video signal. The beginning of curve 80 contains the last two active video lines (lines 524 and 525) of one display field. After the last line (line 525) of one display field, the vertical refresh period starts. The vertical refresh period contains all inactive video lines—that is, the inactive video lines do not carry luminance information or picture information. The vertical refresh period contains a pulse sequence of equalization and serration pulses. More specifically, in the present illustration, the vertical refresh period includes 6 half-lines of pre-equalizing pulses, followed by 6 half-lines of serration pulses, followed by 6 half-lines of post-equalizing pulses. Following the post-equalizing pulses are inactive video lines up to video line 20. Active video lines start at line 21. The exact number of half-lines and inactive video lines may vary for odd or even fields and for different transmission standards. The pulse sequence shown in FIG. 6 is illustrative only. The pulse sequence repeats when the current display field reaches the last active video line and transitions the vertical refresh period before the next display field.

In the exemplary embodiment shown in FIG. 6, the analog modulated television signal is assumed to be an NTSC formatted signal. The use of the NTSC formatted television signal here is illustrative only and is not intended to be limiting. Analog television signals of other transmission standards will have the same inactive video period between two successive vertical fields but other standards may have different number of lines per field and different numbers of equalizing and serration pulses in the pulse sequence. The exact nature of the pulse sequence in the inactive video period is not critical to the practice of the present invention. The vertical field detect circuit of the present invention can be applied in mixed signal television receivers configured to receive analog modulated television signals under any transmission standard.

Vertical Field Detect Method

According to embodiments of the present invention, a vertical field detect method in a mixed-signal television receiver down converts an incoming analog modulated television signal to a low-IF or zero-IF signal and the method detects the presence of the serration pulse sequence in the not-fully-demodulated low/zero-IF signal as an indicator of vertical field synchronization. More specifically, the method recognizes the detected presence of serration pulse sequence as an indication of the vertical refresh period between two successive display fields. The method generates a vertical field detect signal which can be used by a monitoring circuit to schedule the measurement and adjustment operations so that the measurement and adjustment operations are performed during the inactive video period.

FIG. 6 further illustrates the generation of the vertical field detect signal and the scheduling of monitoring operations in accordance with the vertical field detect method of the present invention. In the present description, "monitoring operations" refer collectively to the measurements and adjustments operations performed by the television receiver to enhance the performance of the television receiver. The monitoring operations can include analog circuitry calibration and/or signal amplification and other measurement and adjustment operations.

The vertical field detect method operates on a down-converted low IF or zero-IF signal that has not been fully demodulated, such as the low/zero-IF signal of FIG. 4. In the following description, the vertical field detect method is described with reference to curve 80 in FIG. 6 which depicts a fully demodulated video signal. It is understood that the fully demodulated video signal 80 in FIG. 6 is not the signal operated on by the vertical field detect method of the present invention but is used here for ease of illustration. In operation, the vertical field detect method looks for the presences of the serration pulse sequence in the not-fully-demodulated low/zero-IF signal. The serration pulses can be detected by searching for a long time period of a low or high signal level (depending on the modulation polarity) on the envelope of the low/zero-IF signal. In one embodiment, the presence of the serration pulses is detected by searching for the minimum or a valley of a signal indicative of the weighted average magnitude of the envelope of the low/zero-IF signal over a given time period. A minimum or a valley in the weighted average magnitude of the modulating video signal is an indicator of the end of the serration pulses. In other embodiment, the presence of the serration pulses can be detected by searching for the maximum or a peak of a signal indicative of the weighted average magnitude of the envelope of the low/zero-IF signal over a given time period.

When the end of the serration pulses is detected, the vertical field detect method generates a vertical field detect signal VF(t) indicating the television signal is in the vertical refresh period with no active video display. In one embodiment, the vertical field detect signal VF(t) is a pulse train where a pulse is generated to indicate the detection of the serration pulse sequence and that the video signal is now in the vertical refresh period between two successive display fields.

The timing curve 84 in FIG. 6 depicts the activities of the monitoring circuit in the mixed-signal receiver. The monitoring activity is normally inactive. When the vertical field detect signal VF(t) is generated, that is, when a pulse in the vertical field detect signal VF(t) is generated, the monitoring operation is activated a given delay Td after the vertical field detect signal VF(t) pulse. When the vertical field detect signal VF(t) is generated, the television signal is still transmitting only inactive video lines. The monitoring circuit of the television receiver performs measurement and adjustment operations during the vertical refresh period and the monitoring operation is completed before the first active video line (such as line 21) of the subsequent video line. There is typically sufficient time from the end of the serration pulses to the first line of active video to perform all of the measurement and adjustment operations. In one embodiment, the delay Td is selected so that the monitoring operation does not start until after the post-equalizing pulses. In other embodiments, the delay Td can be shortened so that the monitoring operation can start during the post-equalizing pulses. The exact time when the monitoring activity can start is not critical to the practice of the present invention. The dotted box 82 in FIG. 6 represents the possible monitoring period when monitoring activities can take place after the field detect signal pulse is generated. The delay Td can be small or zero to allow the monitoring operation to start immediately after generation of the field detect signal pulse. In practice, the time it takes to perform the monitoring operations is short, such as much less than half a millisecond, and it is only preferred that the monitoring operation be completed before the first line of active video. Thus, the monitoring operation can be carried out any time during the monitoring period 82, that is after the assertion of the field detect signal and before, during or after the post-equalizing pulses.

The vertical field detect method of the present invention allows the television receiver to schedule measurement and adjustment activities to occur during inactive video lines. The ability to schedule measurement and adjustment activities during inactive video time offers many advantages. First, because no luminance information is carried during inactive video line, the inactive video period can be used to perform measurements, such as DC measurement in a zero-IF receiver without risking having the wideband modulated luminance signal impairing the measurement. Second, coarse transformations such as moderate-to-big signal amplification can be made without visual impairments for the viewer. Third, the ability to delay the monitoring activities until after the post-equalizing pulse train guarantees no impairment to any subsequent vertical detector circuitry that uses the pulse sequence Equalization-Serration-Equalization to operate. Finally, updating coarse parameters at field rate (.i.e. 50 to 60 Hz) or sub-multiples of the field rate is generally fast enough to maintain good performances.

RF Receiver Architecture

As described above, the vertical field detect circuit and method of the present invention is applicable in Analog-Only or Hybrid television receivers receiving an analog modulated television signal. The television receivers can be constructed using the RF-only architecture or using the Two-In-One architecture. However, the vertical field detect circuit and method of the present invention is particularly useful in an RF-only TV receiver as the TV receiver generates only a low-IF or zero-IF signal that is not fully demodulated as the processed output signal. In particular, a Two-In-One TV tuner generates a CVBS signal at its output and therefore the receiver has access internally to a signal such as the fully demodulated video signal 80 depicted in FIG. 6 and the monitoring circuit can use the CVBS signal to detect the serration pulse sequence. However, an RF-Only receiver has reduced processing capabilities and does not have access to a baseband composite video signal or a fully demodulated video signal. The RF-only receiver only has available a low/ zero-IF VSB-modulated TV signal carrying luminance, chrominance and audio data altogether, as depicted in FIG. 4.

In accordance with embodiments of the present invention, a vertical field detect circuit is incorporated in an RF-Only television receiver or a Two-In-One television receiver to detect the serration pulse sequence during the vertical refresh period using the low-IF signal or the zero-IF signal that have not been fully demodulated. The vertical field detect circuit can be implemented using simple circuitry to generate a field detect signal to indicate the inactive video period between successive display fields of an analog modulated video signal.

RF-Only TV Receiver with Vertical Field Detect Circuit

Figure 7:
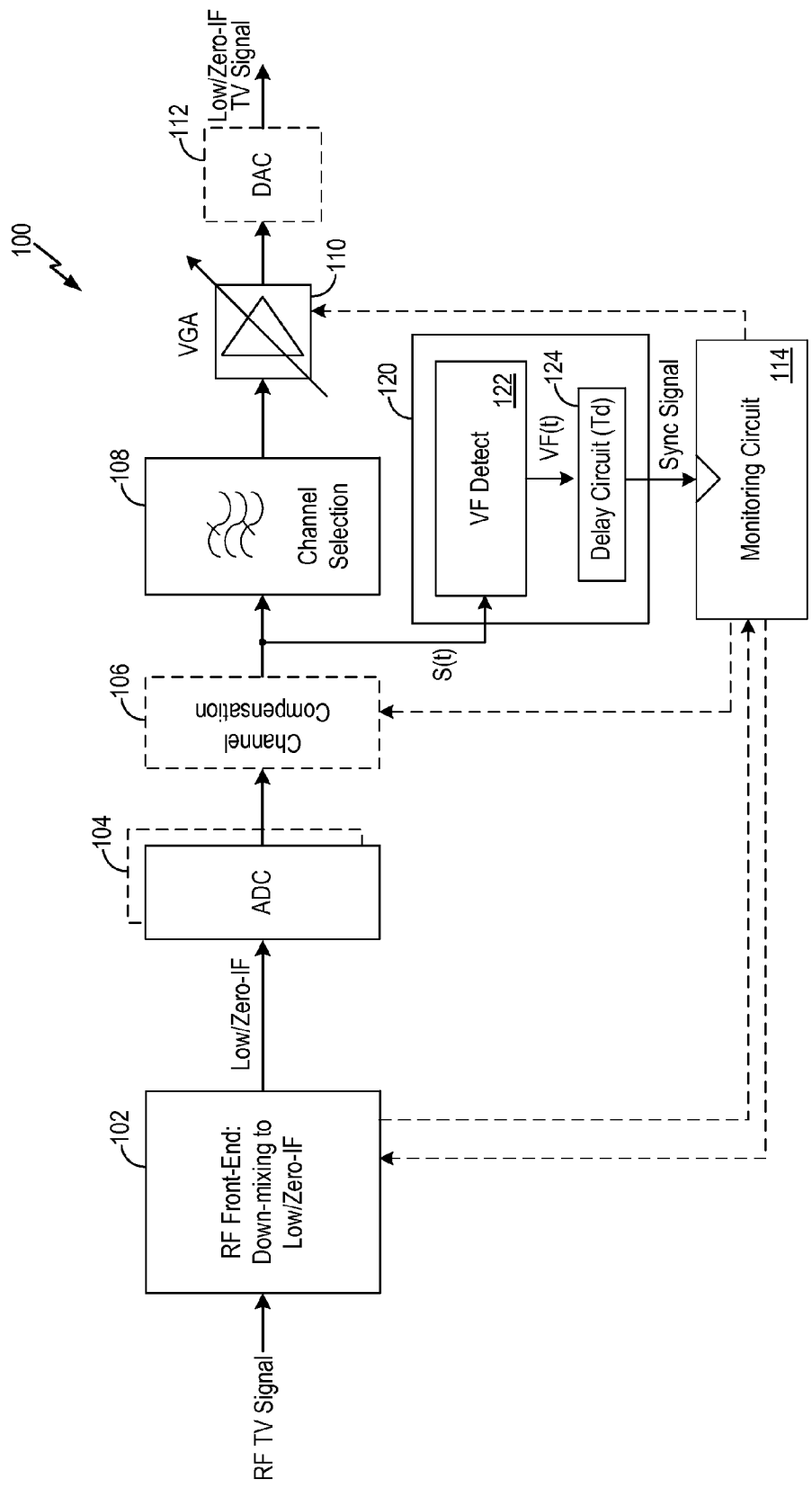
FIG. 7 is a schematic diagram of a mixed-signal RF-Only television receiver incorporating a vertical field detect circuit according to one embodiment of the present invention.

FIG. 7 is a schematic diagram of a mixed-signal RF-Only television receiver incorporating a vertical field detect circuit according to one embodiment of the present invention. Referring to FIG. 7, a mixed-signal RF-Only television receiver 100 includes an RF front-end circuit 102 configured to receive an incoming RF television signal. The television signal is assumed to be an analog modulated television signal. The RF front-end circuit 102 operates to down-mix the incoming RF signal to a low-IF or zero-IF signal. The low/zero-IF signal is coupled to an analog-to-digital converter (ADC) 104 to be digitized so that the subsequent processing of the low/zero-IF signal is carried out in the digital domain. In the case the down-converted signal is a zero-IF signal, the ADC 104 will actually include two ADC circuits to process the zero-IF signal in complex representation. Optional channel compensation (circuit 106) may be applied to the digitized low/zero-IF signal. After channel compensation, if any, the digitized low/zero-IF signal is processed by a channel selection circuit 108, selecting a desired channel from the received television signal. The low/zero-IF signal of the selected channel is then coupled to a variable gain amplifier VGA 110. After signal amplification, the digitized low/zero-IF signal may be converted back to the analog domain by a digital-to-analog converter 112 before being provided as the output signal of the receiver 100.

The television receiver 100 also includes a monitoring circuit 114 configured to measure operational parameters of the circuitry in the receiver and to apply compensation to enhance the performance of the receiver. In the present embodiment, the monitoring circuit 114 measures operational parameters of the RF front-end circuit 102, and adjusts or calibrates the RF front-end circuit 102, the channel compensation circuit 106 (where applicable) and the variable gain amplifier 110.

In embodiments of the present invention, the television receiver 100 includes a vertical field detect circuit 120 to detect the vertical refresh period between successive vertical display fields in the television signal. The vertical field detect circuit 120 includes a vertical field detector circuit 122 and a delay circuit 124. The vertical field detector circuit 122 receives the digitized low-IF or zero-IF signal as an input signal S(t). The input signal S(t) can be taken from before or after channel compensation, when channel compensation is applied. In the present embodiment, the input signal S(t) is taken after channel compensation. The signal S(t) is provided to the vertical field detector circuit 122 which operates on the signal S(t) and generates a vertical field detect signal VF(t) indicative of the end of the serration pulses in the television signal. In one embodiment, the vertical field detect signal VF(t) is a pulse train where a pulse is generated each time the end of the serration pulse sequence is detected. The vertical field detect signal VF(t) is coupled to the delay circuit 124 which applies a delay of Td to the vertical field detect signal pulse. The delayed signal pulse is then provided to the monitoring circuit 114 as a synchronization (Sync) signal. In operation, the monitoring circuit 114 initiates the monitoring operation, including measurements and adjustments, after the Sync signal is asserted.

As described above, the delay circuit 124 may apply a small or zero delay to the vertical field detect signal VF(t) depending on the television receiver. The vertical field detect signal is asserted when the end of the serration pulse sequence is detected. After the serration pulse sequence, there are several post-equalizing pulses and then inactive video lines. The monitoring circuit 114 may start the monitoring operation when the vertical field detect signal pulse is generated or after a given delay, such as after the post-equalizing pulses. Delay circuit 124 is optional and may be omitted in some embodiments of the present invention.

In this manner, the vertical field detect circuit 120 receives the low/zero-IF signal S(t) and generates a Sync signal for the monitoring circuit to synchronize the monitoring operation to the vertical refresh period.

Two-in-One TV Receiver with Vertical Field Detect Circuit

Figure 8:
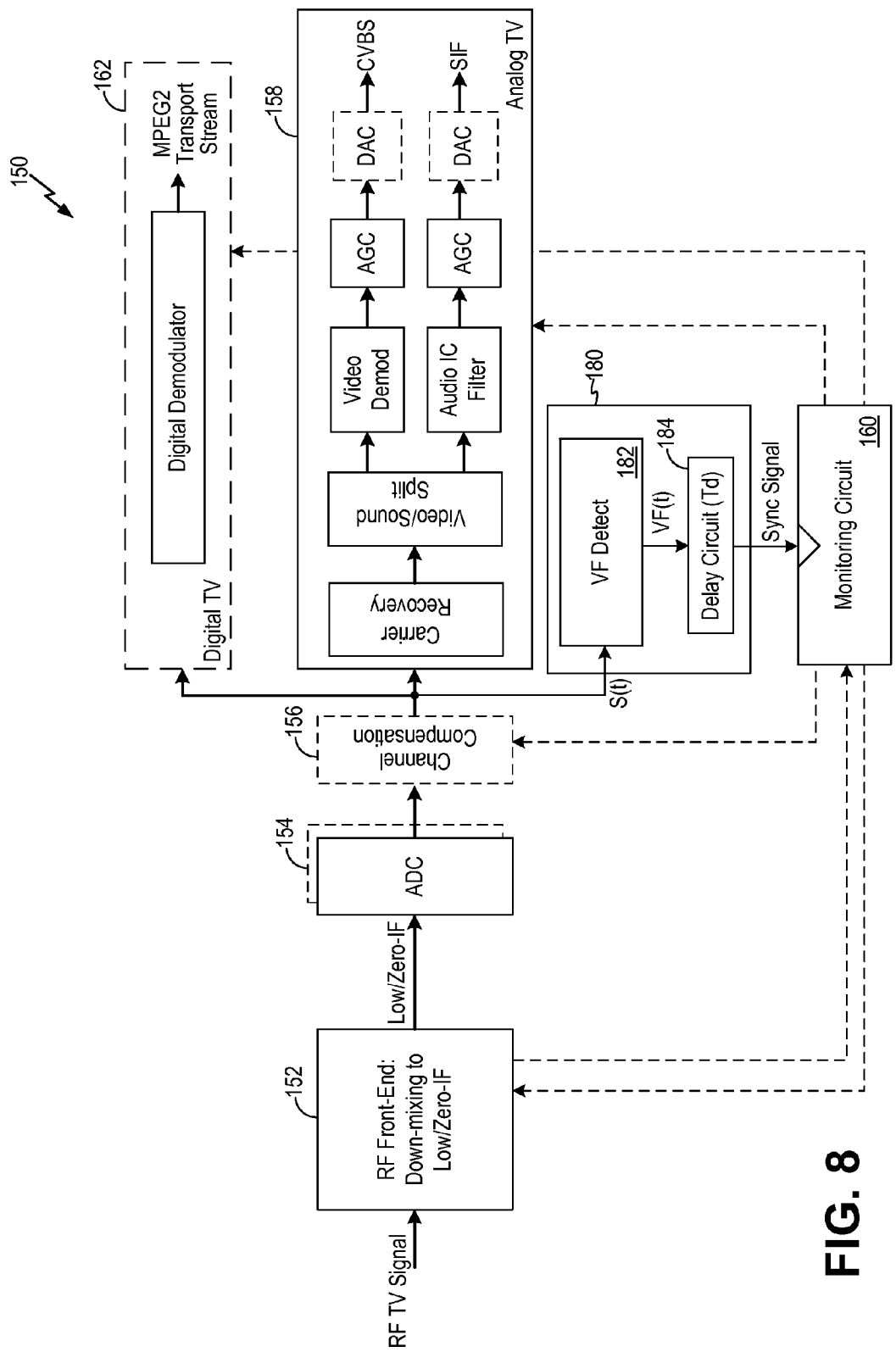
FIG. 8 is a schematic diagram of a mixed-signal Two-In-One television receiver incorporating a vertical field detect circuit according to one embodiment of the present invention.

FIG. 8 is a schematic diagram of a mixed-signal Two-In-One television receiver incorporating a vertical field detect circuit according to one embodiment of the present invention. As described above, although a Two-In-One television receiver generates a CVBS signal which can provide the timing information for vertical field detection, the vertical field detect circuit and method of the present still provides advantages when implemented in a Two-In-One receiver to allow vertical field detection to be performed on the not-fully-demodulated IF signal.

Referring to FIG. 8, a mixed-signal Two-In-One television receiver 150 includes an RF front-end circuit 152 configured to receive an incoming RF television signal. The television signal is assumed to be an analog modulated television signal. The RF front-end circuit 152 operates to down-mix the incoming RF signal to a low-IF or zero-IF signal. The low/zero-IF signal is coupled to an analog-to-digital converter (ADC) 154 to be digitized so that the subsequent processing of the low/zero-IF signal is carried out in the digital domain. In the case the down-converted signal is a zero-IF signal, the ADC 154 will actually include two ADC circuits to process the zero-IF signal in complex representation. Optional channel compensation (circuit 156) may be applied to the digitized low/zero-IF signal. After channel compensation, if any, the digitized low/zero-IF signal is provided to an analog television demodulation circuit 158. The analog television demodulation circuit 158 performs carrier recovery, separation of video and sound signals, demodulation and filtering of the video and audio signals, signal amplification and, if needed, digital to analog conversion. The analog television demodulation circuit 158 generates CVBS as the video output signal and SIF as the audio output signal.

In the case where the Two-In-One television receiver 150 is a hybrid receiver, the receiver may further include a digital television demodulation circuit 162 including a digital demodulator to receive digital modulated television signal and to generate a MPEG2 transport stream as the output signal.

The television receiver 150 includes also a monitoring circuit 160 configured to measure operational parameters of the circuitry in the receiver and to apply compensation to enhance the performance of the receiver. In the present embodiment, the monitoring circuit 160 measures operational parameters of the RF front-end circuit 152, and adjusts or calibrates the RF front-end circuit 152, the channel compensation circuit 156 (where applicable), the analog television demodulation circuit 158 and the digital television demodulation circuit 162.

In embodiments of the present invention, the television receiver 150 includes a vertical field detect circuit 180 to detect the vertical refresh period between successive vertical display fields in the television signal. The vertical field detect circuit 180 is configured in the same manner as the vertical field detect circuit 120 of FIG. 7 and includes a vertical field detector circuit 182 and a delay circuit 184. The vertical field detector circuit 182 receives the digitized low-IF or zero-IF signal as an input signal S(t). The input signal S(t) can be taken from before or after channel compensation, when channel compensation is applied. The signal S(t) is provided to the vertical field detector circuit 182 which operates on the signal S(t) and generates a vertical field detect signal VF(t) indicative of the end of the serration pulse sequence in the television signal. The vertical field detect signal VF(t) is then coupled to the delay circuit 184 which applies a delay of Td to the vertical field detect signal pulse. The delayed signal pulse is then coupled to the monitoring circuit 160 as a synchronization (Sync) signal. In operation, the monitoring circuit 160 initiates the monitoring operation, including measurements and adjustments, after the Sync signal is asserted. As described above, the delay circuit 184 may apply a small or zero delay to the field detect signal depending on the television receiver.

In this manner, the vertical field detect circuit 180 receives the low/zero-IF signal S(t) and generates a Sync signal for the monitoring circuit to synchronize the monitoring operation to the vertical refresh period.

Vertical Field Detector Circuit

Figure 9:
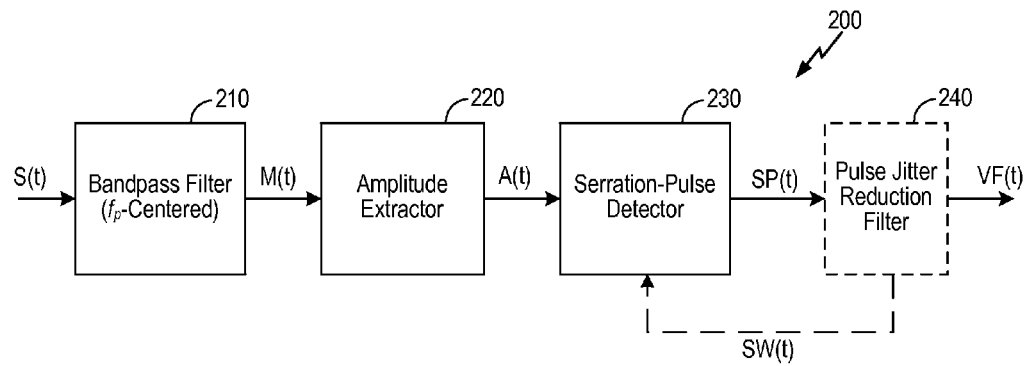
FIG. 9 is a schematic diagram of a vertical field detector circuit in a vertical field detect circuit which can be incorporated in a mixed-signal television receiver according to embodiments of the present invention.

FIG. 9 is a schematic diagram of a vertical field detector circuit in a vertical field detect circuit which can be incorporated in a mixed-signal television receiver according to embodiments of the present invention. In embodiments of the present invention, the vertical field detector circuit operates to extract timing information associated with the serration pulses using the not-fully-modulated low/zero-IF signal. In one embodiment, the vertical field detector circuit is implemented as an asynchronous demodulator configured to extract low frequency components of the complex envelope of the VSB-modulated low/zero-IF signal. In the present description, the envelope of the VSB-modulated low/zero-IF signal (FIG. 4), is said to be complex or non-symmetric as compared to a real, symmetric double-side band signal, such as a pure AM modulation signal. In operation, the envelop of the low/zero-IF signal is searched for the equalizing-serration-equalizing pulse pattern during the vertical refresh period, as depicted in FIG. 6.

Referring to FIG. 9, a vertical field detector circuit 200 is formed by a bandpass filter 210, an amplitude extractor 220, and a serration-pulse detector 230. In some embodiments, a pulse jitter reduction filter 240 is included to enhance the detection accuracy. The operation of the vertical field detector circuit 200 will be first described in brief and the exemplary embodiments of the functional blocks of the vertical field detector circuit will be presented. It is understood that the exemplary embodiments in the below description are illustrative only and the vertical field detector circuit can be implemented in other ways using other circuitry to accomplish the same vertical field detection function.

In operation, the vertical field detector circuit 200 receives the not-fully-demodulated low/zero-IF signal S(t) as the input signal. In the present embodiment, the low/zero-IF signal S(t) is digitized. In other embodiments, the low/zero-IF signal S(t) may be an analog signal, as will be described in more detail below. The input signal S(t) is provided to the bandpass filter 210 implementing a filter with a symmetrical pass band and a center frequency $f_p$ at the visual carrier of the low/zero-IF signal. The bandpass filter 210 filters out the high frequency components in the low/zero-IF signal so that the chroma and audio signal components are filtered out while the luminance information is retained to allow for serration pulse detection. Furthermore, the bandpass filter 200 is also designed to filter out high frequency components that fall out of the Vestigial-Side-Band area. The bandpass-filtered signal M(t) is an amplitude modulated signal.

The bandpass-filtered signal M(t) is then provided to the amplitude extractor 220 to remove the carrier signal and to extract the envelope of the amplitude modulated signal M(t). The recovered modulation envelope signal A(t) is then provided to the serration-pulse detector 230 to detect the presence of the serration pulse sequence, which is indicated by a long period of a low signal amplitude. The serration-pulse detector 230 operates to detect a local minimum in the filtered envelope signal A(t) where the local minimum indicates the end of the serration pulse sequence. In one embodiment, the serration-pulse detector 230 uses a filter to detect a long time of minimum pulse amplitude. The serration-pulse detector 230 is capable of generating reliable and accurate detection results with good noise rejection as the serration pulse sequence is low for a long period of time relative to the active video signals and the equalization pulses in the television signal. Thus, the serration-pulse detector 230 can use a long filter to improve the detection accuracy. In particular, because the serration-pulse detector 230 has very good SNR rejection, the detection operation is very robust and does not require the filter to be perfectly matched with the recovered envelop signal A(t) during the serration pulse interval. The serration-pulse detector 230 generates a serration pulse detect signal SP(t) being a pulse train with a pulse is generated to indicate the detection of the end of the serration pulse sequence. In some embodiments, the serration pulse detect signal SP(t) is used directly as the field detect signal VF(t).

In embodiments of the present invention, the vertical field detector circuit 200 includes a pulse jitter reduction filter 240 to reduce possible jitters on the serration pulse detect signal SP(t). In cases where the filter of the serration-pulse detector 230 is not exactly matched with the serration pulse pattern, the resulting filtered signal C(t) (FIG. 12) at the output of the correlator in the serration-pulse detector 230 may have a plateau pattern that creates uncertainties (.i.e. jitter) during the search of the position of its local minimum value. This jitter in the serration pulse detect signal SP(t) or the field detect signal VF(t) is usually not critical as the vertical field detect circuit can insert a delay after the vertical field detect signal before the monitoring activity is initiated. However, if a more defined field detect signal pulse is desired, then the pulse jitter reduction filter 240 can be used to filter the serration pulse detect signal SP(t). In one embodiment, the pulse jitter reduction filter 240 is implemented as a phase-locked loop (PLL) to lock on the serration pulse detect signal pulse. The pulse jitter reduction filter 240 can also be used to generate a timing signal SW(t) that defines the position of a timing window during which the minimum is searched, thereby avoiding false local minima. The PLL can operate at a low frequency.

Exemplary embodiments of the functional blocks of the vertical field detector circuit will now be described in more details. The implementations described below are illustrative only and are not intended to be limiting. The vertical field detector circuit can be implemented in other ways to accomplish the same function of detecting for the presence of the serration pulse sequence.

Figure 10:
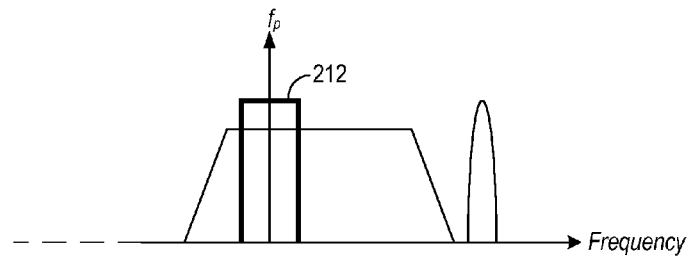
FIG. 10 illustrates the filter characteristics of a bandpass filter which can be incorporated in the vertical field detector circuit according to one embodiment of the present invention.

FIG. 10 illustrates the filter characteristics of a bandpass filter which can be incorporated in the vertical field detector circuit according to one embodiment of the present invention. Referring to FIG. 10, curve 212 illustrates the pass band of the bandpass filter 210 used in the vertical field detector circuit. The bandpass filter 210 has a symmetrical pass band and a center frequency $f_p$ at the visual carrier of the low/zero-IF signal. The pass band of the bandpass filter 210 has a bandwidth large enough so that enough luminance information is retained for the detection of the serration pulses but also small enough to span only the double side part of the spectrum around the center frequency. In this manner, the high frequency signal components, such as the chroma and audio signal components, are filtered out. As a result, the bandpass-filtered signal M(t) has a spectrum that is symmetric around the visual carrier and the bandpassed signal is a purely amplitude modulated signal. The bandpass filter 210 also improves the detection quality by filtering out additive noise whose energy is located outside of the pass-band bandwidth.

An important feature of the vertical field detector circuit is that perfect alignment of the bandpass filter 210 around the visual carrier is not necessary and that the exact bandwidth of the bandpass filter is also not critical. The vertical field detector circuit of the present invention is operationally robust so that non-perfect filtering or frequency misalignment can be well tolerated. In one embodiment, the bandpass filter 210 has a bandwidth of ±400 KHz. Furthermore, the bandpass filter can be synthesized as finite or infinite impulse response filter.

Figure 11:
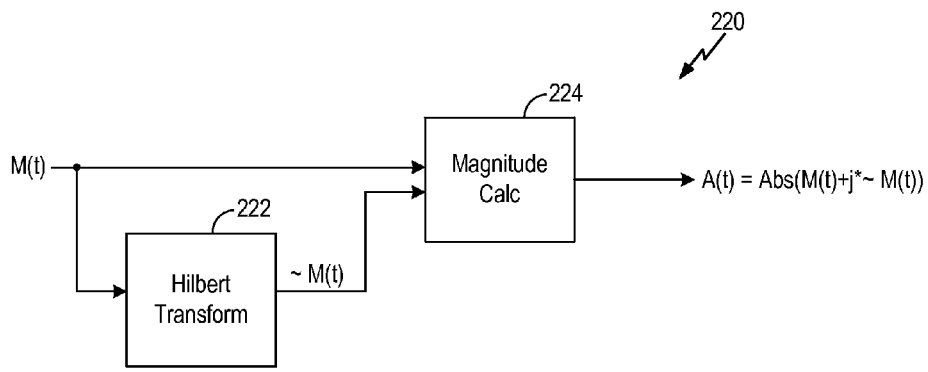
FIG. 11 is a schematic diagram of an amplitude extractor which can be incorporated in the vertical field detector circuit according to one embodiment of the present invention.
Figure 15:
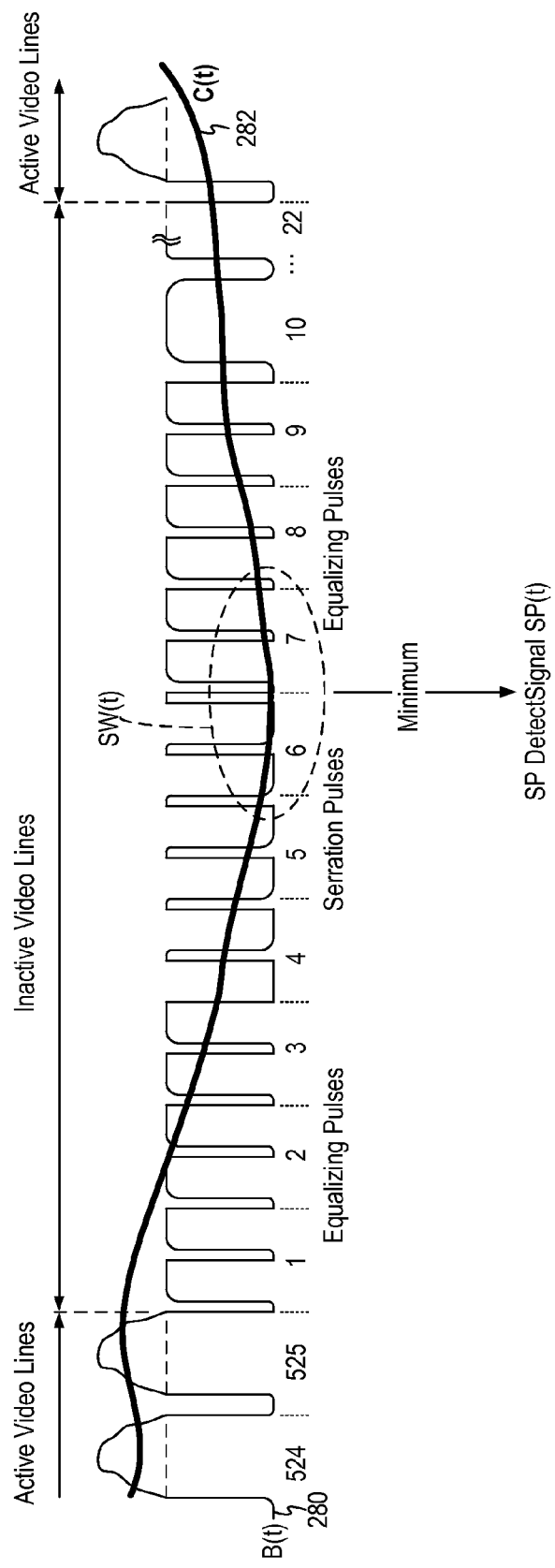
FIG. 15 illustrates the recovered video signal and the detection of the serration-pulse sequence using the vertical field detector circuit according to one embodiment of the present invention.

FIG. 11 is a schematic diagram of an amplitude extractor which can be incorporated in the vertical field detector circuit according to one embodiment of the present invention. Referring FIG. 11, the amplifier extractor circuit 220 receives the bandpass-filtered signal M(t) and operates to extract the modulating envelope signal A(t), being an image of the baseband luminance signal (curve 80 in FIG. 6). FIG. 15 illustrates the recovered envelope signal and the detection of the serration-pulse sequence using the vertical field detector circuit according to one embodiment of the present invention. The recovered envelope signal A(t) is shown as curve 280 in FIG. 15. In FIG. 15, curve 280 is denoted as a signal B(t) which is a positive polarity signal based on the recovered signal A(t). Because television signals can be a positive modulated or negative modulated signal, the recovered envelope A(t) may have positive or negative polarity. In the vertical field detector circuit, regardless of the positive or negative modulation of the recovered envelope signal A(t), the signal is converted to a positive polarity signal B(t) for processing. Thus, signal B(t) corresponds to signal A(t) when the television signal has a positive modulation and corresponds to the inverse of the signal A(t) when the television signal has a negative modulation.

The amplitude extractor 220 can be implemented in various ways. In the embodiment shown in FIG. 11, the amplitude extractor 220 is implemented using a Hilbert Transform filter 222 and a Magnitude Calculator 224. First, a signal ~M(t), being the Hilbert-Transform of the bandpass-filtered signal M(t), is computed. Then, the Magnitude Calculator 224 computes the complex phasor X(t)=M(t)+j*~M(t). The complex signal X(t) can be expressed as $X(t)=A(t) \cdot e^{j \cdot phi(t)}$, where A(t) is the modulating envelope, that is, the instantaneous amplitude of the phasor. Simple circuitry can then be used to recover the signal A(t), where A(t) is the absolute value of (M(t)+j*~M(t)). In an alternate embodiment, the Hilbert Transform filter is incorporated into the bandpass filter 210 so that the bandpass-filtered signal M(t) is itself a complex signal after the bandpass filtering.

In yet another embodiment, the modulation envelope is recovered directly from the bandpass-filtered signal M(t) using peak-envelope detection methods, such as those commonly employed in analog implementations of AM-demodulator to recover the modulating envelope.

Figure 12:
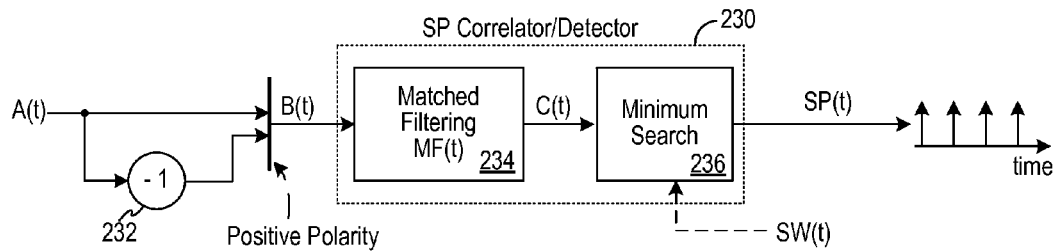
FIG. 12 is a schematic diagram of a serration-pulse detector which can be incorporated in the vertical field detector circuit according to one embodiment of the present invention.

FIG. 12 is a schematic diagram of a serration-pulse detector which can be incorporated in the vertical field detector circuit according to one embodiment of the present invention. The serration-pulse detector 230 receives the recovered envelope signal A(t) and detects the presence of the serration pulse sequence in the recovered modulation envelope signal A(t). Each time the serration pulse sequence is detected, the serration-pulse detector 230 generates the serration pulse detect signal SP(t) which is an pulse train-like signal.

Techniques for extracting and locating a known pattern from an incoming noisy signal are known. In the present embodiment, a matched filter (also called pulse filter) with minimum or maximum output detection is used to detect the presence of the serration pulse sequence in the incoming signal. The matched filter maximizes the detection SNR. Referring to FIG. 12, as described above, because the TV standard can be positively or negatively modulated, a sign inversion (block 232) of the input A(t) signal is applied in case of negatively modulated signal, such as NTSC-M, to obtain a positive polarity signal B(t) which is then processed by the matched filter circuit 234. In case where the television signal is positively modulated, the input A(t) signal is the same as the positive polarity signal B(t). The matched filter circuit 234 generates a filtered signal C(t) being a signal indicative of the weighted average magnitude of the envelope signal A(t) or B(t). The filtered signal C(t) is then provided to a minimum search block 236 to search for a local minimum in the filtered signal C(t). The detected local minimum is the serration pulse detect signal SP(t).

Figure 13:
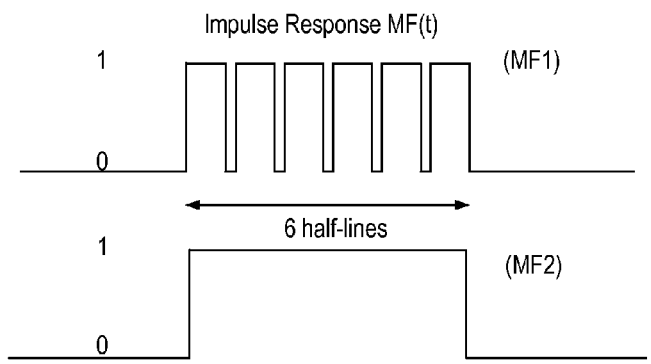
FIG. 13 illustrates two implementations of the matched filter impulse response which can be used in the matched filter circuit of the serration-pulse detector of FIG. 12.

FIG. 13 illustrates two implementations of the matched filter impulse response which can be used in the matched filter circuit of the serration-pulse detector of FIG. 12. The first impulse response MF1 mimics the exact serration pulse sequence which is, in this illustration, 6 half-lines long with half-sync pulses included as zero in the filter coefficients. In other examples, the impulse response MF1 can have 5 half-lines with half-sync pulses. The second impulse response MF2 is an approximation of the MF1 filter with a simple boxcar type filter that neglects the half-sync pulses. Both filter implementations are simple in the sense that the filter coefficients belong to {0,1} and no multiplication is needed. The second impulse response MF2 can be simplified further into the implementation depicted in FIG. 14.

Figure 14:
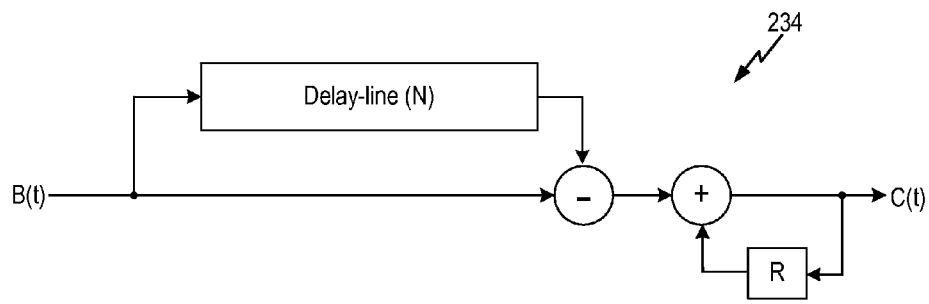
FIG. 14 illustrates the matched filter circuit implementing the second impulse response of FIG. 13 according to one embodiment of the present invention.

FIG. 14 illustrates the matched filter circuit implementing the second impulse response of FIG. 13 according to one embodiment of the present invention. Referring to FIG. 14, when the impulse response MF2 is applied, the matched filter circuit 234 (FIG. 12) can be implemented as a delay line of length N that spans the serration pulse length. The positive polarity envelope signal B(t) and the delay line feed a differentiator cascaded with an integrator. The filtered signal C(t) is generated from the integrator. Different embodiments of the matched filter circuit can be used, such as shortening the filter span (to reduce the size of the delay line length N). When the filter span is shortened, the signal C(t) will plateau and have multiple solutions for the subsequent minimum search. However, a signal C(t) with plateau is often acceptable as no exact precise timing on the vertical field detect signal is necessary at the system level to start the monitoring sequence.

Returning to FIG. 12, the filtered signal C(t) of the matched filter is then searched for minimum corresponding to the end of the serration pulse sequence. When the minimum is detected, a signal pulse SP(t) is generated to indicate a new field detection. In some embodiments, the minimum search block 236 receives an external search window signal SW(t) indicating a coarse searching window in which the search for the minimum should occur. In some embodiments, the search window signal SW(t) is generated by a PLL-type post-filter circuit that locks on the video field rate. The use of search window signal SW(t) is optional and may be omitted in other embodiments of the present invention.

FIG. 15 illustrates the generation of the filtered signal C(t) and the operation of the minimum search block in the serration-pulse detector according to one embodiment of the present invention. Referring to FIG. 15, from the positive polarity envelop signal B(t), the matched filter circuit in the serration-pulse detect circuit generates the filtered signal C(t) (curve 282) which is representative of the weighted average amplitude of the recovered envelop signal. The minimum search block searches for the minimum in the signal C(t). When the minimum is detected, a serration pulse detect signal pulse SP(t) is generated.

In some cases, the pulse train sequence generated by the serration-pulse detector 230 may suffer from jitter due to noise on the C(t) signal as well as non-exact matching between the matched filter impulse response and the serration pulse sequence. The minimum search block may detect multiple minima in the vicinity of the true minimum of the signal C(t). As described above, the exact timing of the Sync Signal provided to the monitoring circuit is not critical and there is sufficient time margin (multiple video lines) from the detection of the serration pulse sequence to the first active video time for the monitoring and adjustment activities to be completed.

Figure 16:
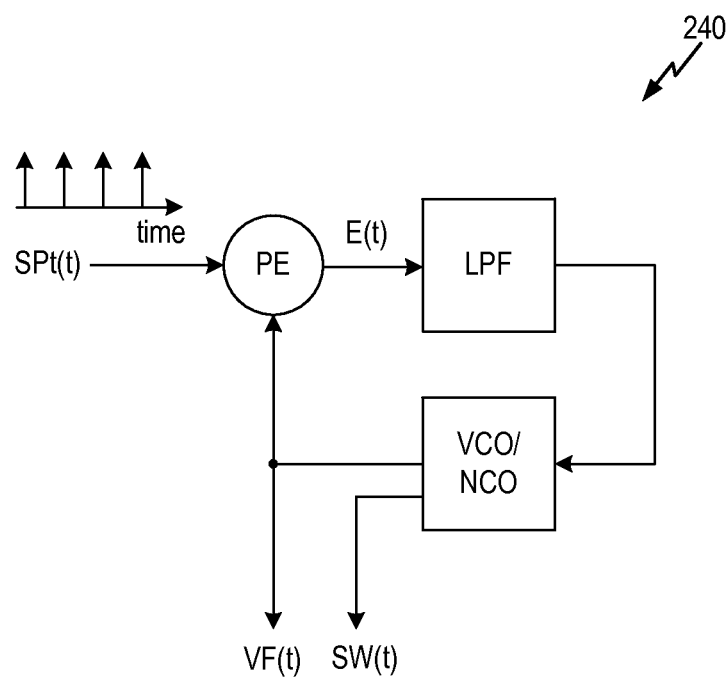
FIG. 16 is a schematic diagram of a pulse jitter reduction filter circuit which can be incorporated in the vertical field detector circuit according to one embodiment of the present invention.

In some embodiments, it may be desirable to remove the jitters from the serration pulse detect signal SP(t). In that case, the pulse jitter reduction filter 240 (FIG. 9) is used to reduce the jittering of the serration pulse detect signal. FIG. 16 is a schematic diagram of a pulse jitter reduction filter circuit which can be incorporated in the vertical field detector circuit according to one embodiment of the present invention. Referring to FIG. 16, the pulse jitter reduction filter circuit 240 is implemented using a PLL (Phase-Locked-Loop) structure that locks on the serration pulse detect signal SP(t) to generate the vertical field detect signal VF(t).

In the pulse jitter reduction filter circuit 240, the signal SP(t) and the signal VF(t) are provided to a phase error detector which generates the error signal E(t) representative of the time difference between those two pulsating signals. The error signal E(t) is provided to a low-pass filter (LPF). The LPF will be adjusted to control the loop bandwidth and therefore the jitter reduction factor. The LPF drives a VCO or NCO (Voltage or Numerically control oscillator) to generate the vertical field detect signal VF(t) that should be aligned, on average, to the incoming SP(t) signal. Furthermore, the PLL of circuit 240 can also be used to generate the search window signal SW(t) provided to the serration-pulse detector 230 to define a coarse area for searching the minimum of the weighted average amplitude of the envelope signal. In other words, once the PLL is locked, the search window signal SW(t) can be used to narrow the minimum search window around the anticipated serration pulse sequence location. The search window signal SW(t) can be generated by detecting when the VCO/NCO internal phase reaches a value (normalized to 2π) equal to the relative timing of SW(t) compared to a field duration. In terms of hardware cost, the PLL function can be serially implemented on any low performance controller because the PLL will mostly operate at low pace (50-60 Hz) corresponding to the vertical field rate.

As described above, with the vertical field detect signal VF(t) thus generated, the synchronization signal Sync for the monitoring circuit can be generated from the vertical field detect signal VF(t) after a given delay which can be zero or a very small delay.

The monitoring circuit of the television receiver will typically be implemented as a finite state machine (FSM) that spends most of its time in an Idle state waiting for the Sync Signal to happen before moving into a Running state where tuner/demodulator parameters are retrieved and circuits adjustment are made if necessary, before returning into the Idle state again waiting for the next Sync pulse to happen. Watchdog timers can be included so that in case of very noisy signal where no valid vertical field detect signal is generated over a given time period, the FSM still reaches into the Running state.

The vertical field detect circuit of the present invention is very robust and can detect the serration pulse sequence even under a very noisy environment. Because of the robustness of the circuit, many of the circuit parameters, such as the matched filter impulse response length or the minimum search algorithm, can be relaxed.

Alternate Embodiments

In the above-described embodiments, the vertical field detect circuit and method operate on a digitized low/zero-IF signal. In other embodiments, the vertical field detect circuit can operate in the analog domain using the low/zero-IF signal in analog format. In that case, the television receiver may be implemented in the analog domain only. Alternately, the television receiver may be a mixed-signal receiver but the low/zero-IF signal is taken before analog-to-digital conversion for use by the vertical field detect circuit and method.

Figure 17:
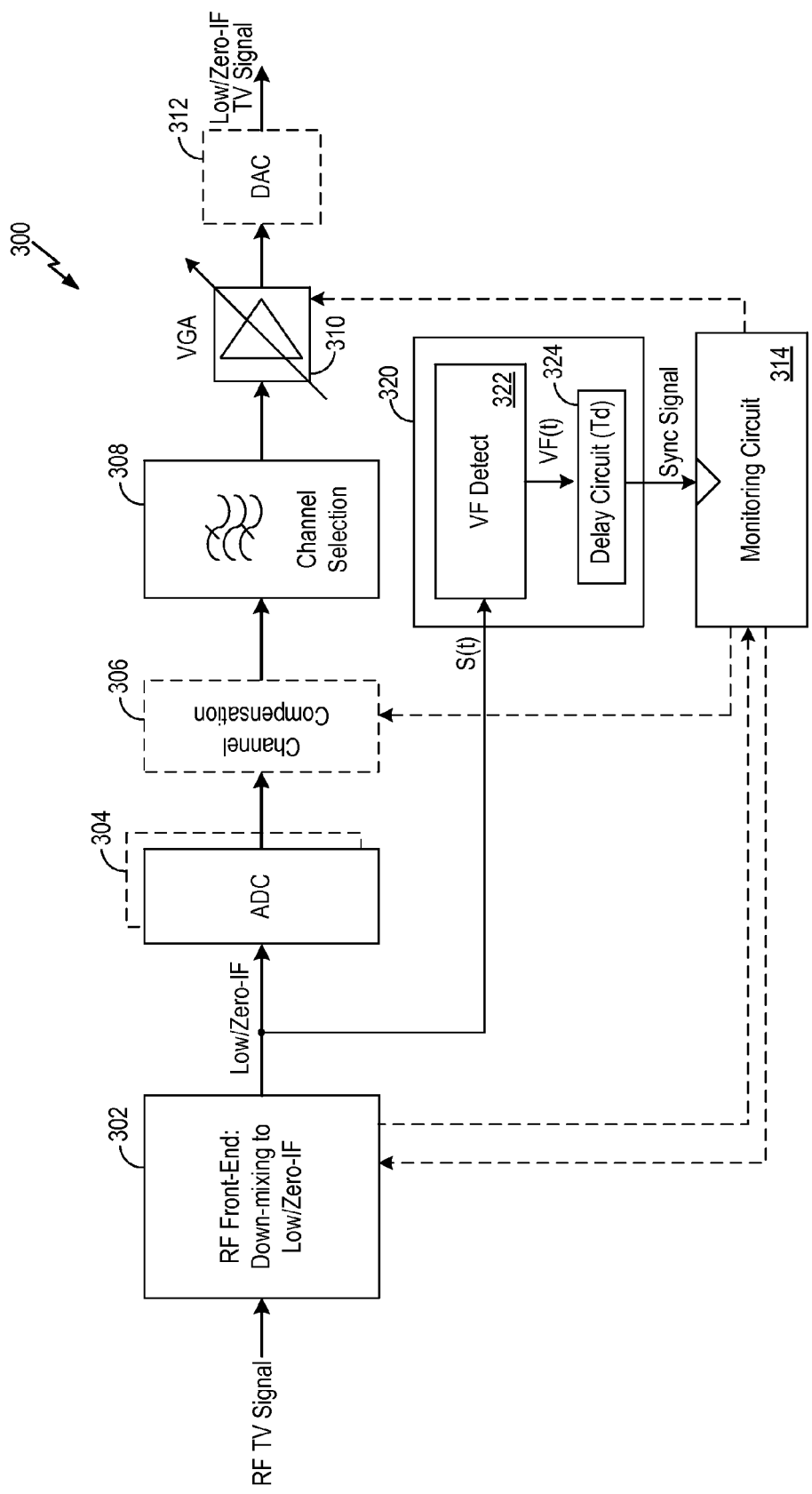
FIG. 17 is a schematic diagram of a mixed-signal RF-Only television receiver incorporating a vertical field detect circuit according to an alternate embodiment of the present invention.
Figure 18:
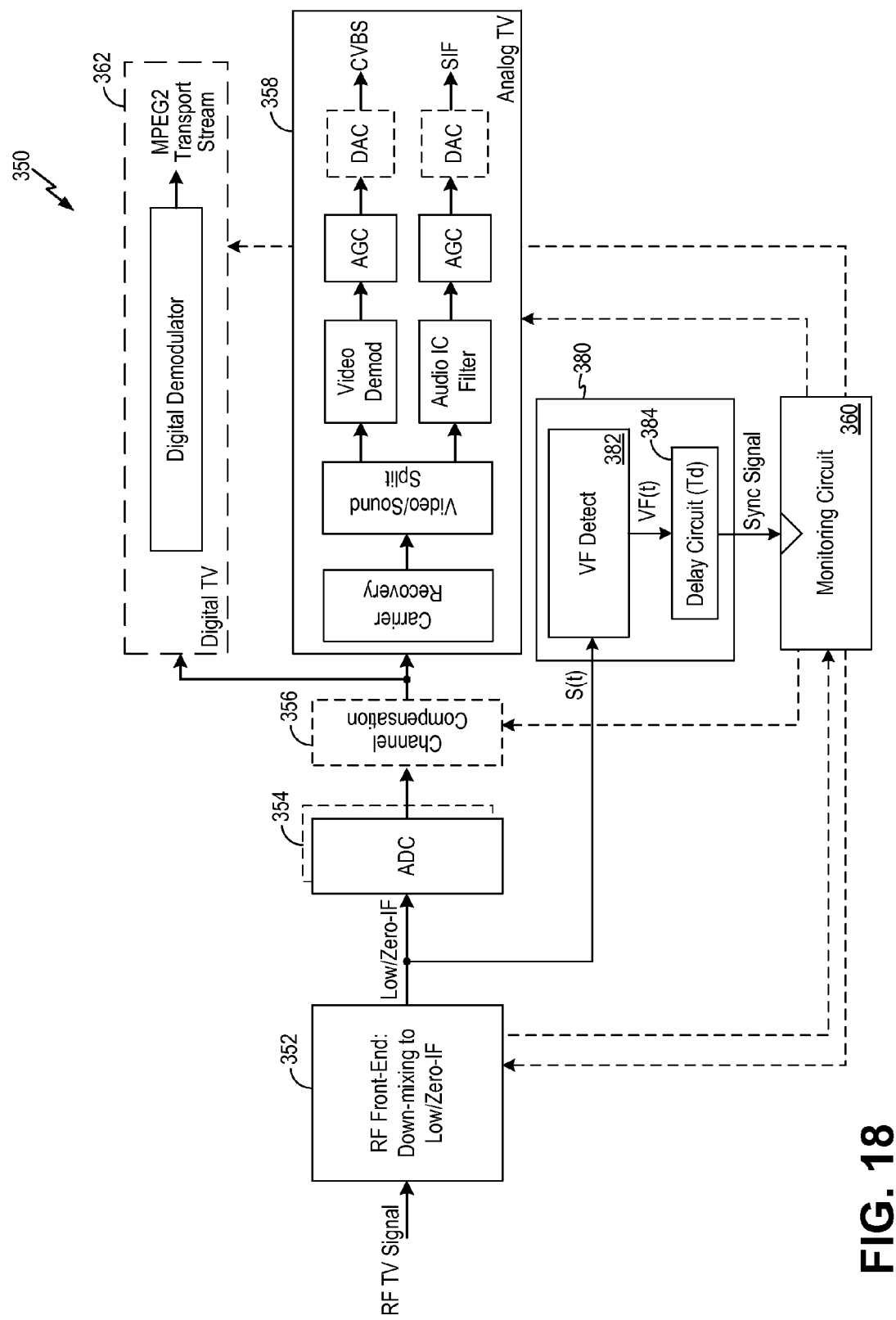
FIG. 18 is a schematic diagram of a mixed-signal Two-In-One television receiver incorporating a vertical field detect circuit according to an alternate embodiment of the present invention.

FIG. 17 is a schematic diagram of a mixed-signal RF-Only television receiver incorporating a vertical field detect circuit according to an alternate embodiment of the present invention. FIG. 18 is a schematic diagram of a mixed-signal Two-In-One television receiver incorporating a vertical field detect circuit according to an alternate embodiment of the present invention. The vertical field detect circuit and method operate in the same manner as described above but in the analog domain to generate the vertical field detect signal VF(t). The vertical field detect signal VF(t), with the delay Td, is then used as the Sync signal to trigger the operation of the monitoring circuit.

The above detailed descriptions are provided to illustrate specific embodiments of the present invention and are not intended to be limiting. Numerous modifications and variations within the scope of the present invention are possible. For example, the serration-pulse detector can be configured to search for a maximum or a peak in the filtered signal C(t) when the envelope signal A(t) is a negatively modulated signal without signal inversion. The present invention is defined by the appended claims.

We claim:

1. A method in a television receiver receiving interlaced analog modulated television signals, comprising:
generating an IF signal having a low intermediate frequency (low-IF) or zero intermediate frequency (zero-IF) from the received analog modulated television signals, the IF signal being a not-fully-demodulated intermediate frequency (IF) signal;

detecting a serration pulse sequence in the IF signal by detecting a first signal level on an envelope of the IF signal, wherein the serration pulse sequence is indicative of an inactive video period in the analog modulated television signal between two successive video display fields;

generating a synchronization signal indicative of the detected inactive video period in response to the detected serration pulse sequence in the IF signal; and in response to the synchronization signal, performing measurement and adjustment operations on analog circuitry of the television receiver, wherein generating the synchronization signal indicative of the detected inactive video period in response to the detected serration pulse sequence in the IF signal comprises: generating a vertical field detect signal in response to the detected serration pulse sequence; and generating the synchronization signal based on the vertical field detect signal; and wherein generating the synchronization signal based on the vertical field detect signal comprises:

delaying the vertical field detect signal; and using the delayed vertical field detect signal as the synchronization signal.

2. The method of claim 1, wherein performing measurement and adjustment operations on analog circuitry of the television receiver comprises:

performing DC offset cancellation, mixer quadrature matching correction and gain adjustments in the analog circuitry of the television receiver.

3. The method of claim 1, wherein generating a vertical field detect signal in response to the detected serration pulse sequence comprises:

generating a vertical field detect signal at the end of the detected serration pulse sequence.

4. The method of claim 1, wherein delaying the vertical field detect signal comprises:

delaying the vertical field detect signal for a duration until the end of the post-equalizing pulses in the IF signal.

5. The method of claim 1, wherein the not-fully-demodulated intermediate frequency (IF) signal comprises a digitized IF signal.

6. The method of claim 5, wherein detecting a serration pulse sequence in IF signal comprises:

filtering the digitized IF signal using a bandpass filter with a center frequency around the visual carrier of the television signal, the bandpass-filtered signal being an amplitude modulated signal;

extracting the envelope of the amplitude modulated signal to generate a recovered envelope signal;

generating an amplitude signal indicative of a weighted average amplitude of the recovered envelope signal over a given period;

detecting a minimum or a maximum in the amplitude signal, the minimum or maximum being indicative of the end of the serration pulse sequence; and generating a serration pulse detect signal in response to detecting the minimum or maximum in the amplitude signal.

7. The method of claim 6, wherein the serration pulse detect signal is the vertical field detect signal.

8. The method of claim 6, further comprising:

reducing jitter on the serration pulse detect signal; and using the jitter-reduced serration pulse detect signal as the vertical field detect signal.

9. A method in a television receiver receiving interlaced analog modulated television signals, comprising:

generating an IF signal having a low intermediate frequency (low-IF) or zero intermediate frequency (zero-IF) from the received analog modulated television signals, the IF signal being a not-fully-demodulated intermediate frequency (IF) signal;

detecting a serration pulse sequence in the IF signal by detecting a first signal level on an envelope of the IF signal, wherein the serration pulse sequence is indicative of an inactive video period in the analog modulated television signal between two successive video display fields; and generating a synchronization signal indicative of the detected inactive video period in response to the detected serration pulse sequence in the IF signal, wherein generating the synchronization signal indicative of the detected inactive video period in response to the detected serration pulse sequence in the IF signal comprises: generating a vertical field detect signal in response to the detected serration pulse sequence; and generating the synchronization signal based on the vertical field detect signal; and wherein generating the synchronization signal based on the vertical field detect signal comprises:

delaying the vertical field detect signal; and using the delayed vertical field detect signal as the synchronization signal.

10. The method of claim 9, further comprising:

in response to the synchronization signal, performing measurement and adjustment operations on analog circuitry of the television receiver.

11. A vertical field detection circuit in a television receiver receiving interlaced analog modulated television signals, the vertical field detection circuit comprising:

a vertical field detector circuit configured to detect a serration pulse sequence in an IF signal generated from the received analog modulated television signals, the IF signal having a low intermediate frequency (low-IF) or zero intermediate frequency (zero-IF) and being a not-fully-demodulated intermediate frequency (IF) signal, the vertical field detector circuit being configured to detect the serration pulse sequence by detecting a first signal level on an envelope of the IF signal, wherein the serration pulse sequence is indicative of an inactive video period in the analog modulated television signal between two successive video display fields, the vertical field detector circuit generating a vertical field detect signal indicative of the detected inactive video period in response to the detected serration pulse sequence in the IF signal; and a delay circuit configured to apply a predetermined delay to the vertical field detect signal to generate a synchronization signal, wherein measurement and adjustment operations on analog circuitry of the television receiver is performed in response to the synchronization signal.

12. The vertical field detection circuit of claim 11, wherein the not-fully-demodulated intermediate frequency (IF) signal comprises a digitized IF signal.

13. The vertical field detection circuit of claim 12, wherein the vertical field detector circuit comprises:

a bandpass filter configured to bandpass filter the digitized IF signal using a bandpass filter with a center frequency around the visual carrier of the television signal, the bandpass-filtered signal being an amplitude modulated signal;

an amplitude extractor configured to extract the envelope of the amplitude modulated signal to generate a recovered envelope signal; and a serration-pulse detector configured to detect a minimum or maximum in the recovered envelope signal, the minimum or maximum being indicative of the end of the serration pulse sequence, the serration-pulse detector generating a serration pulse detect signal in response to detecting the minimum or maximum in the recovered envelope signal, wherein the serration pulse detect signal is the vertical field detect signal.

14. The vertical field detection circuit of claim 13, further comprising:

a jitter rejection filter configured to reduce pulse jittering on the serration pulse detect signal, the jitter-reduced serration pulse detect signal being the vertical field detect signal.

15. The vertical field detection circuit of claim 11, wherein the television receiver comprises an RF-only television receiver or a Two-In-One television receiver.

* * * * *